(12) United States Patent
Hansen

(10) Patent No.: US 10,280,896 B2
(45) Date of Patent: May 7, 2019

(54) LIGHTNING PROTECTION SYSTEM FOR A WIND TURBINE BLADE

(71) Applicant: LM WP PATENT HOLDING A/S, Kolding (DK)

(72) Inventor: Lars Bo Hansen, Agerskov (DK)

(73) Assignee: LM WP PATENT HOLDING A/S, Kolding (DK)

( * ) Notice: Subject to any disclaimer, the term of this patent is extended or adjusted under 35 U.S.C. 154(b) by 694 days.

(21) Appl. No.: 14/891,990

(22) PCT Filed: May 22, 2014

(86) PCT No.: PCT/EP2014/060536
§ 371 (c)(1),
(2) Date: Nov. 18, 2015

(87) PCT Pub. No.: WO2014/187895
PCT Pub. Date: Nov. 27, 2014

(65) Prior Publication Data
US 2016/0090968 A1 Mar. 31, 2016

(30) Foreign Application Priority Data
May 24, 2013 (EP) ..................................... 13169221

(51) Int. Cl.
F03D 1/06 (2006.01)
H01Q 1/22 (2006.01)
F03D 80/30 (2016.01)

(52) U.S. Cl.
CPC ........... F03D 1/0675 (2013.01); F03D 80/30 (2016.05); H01Q 1/22 (2013.01); Y02E 10/721 (2013.01)

(58) Field of Classification Search
CPC ..... F03D 11/0033; F03D 1/0675; F03D 80/30
See application file for complete search history.

(56) References Cited

U.S. PATENT DOCUMENTS 9,882,368 B2 * 1/2018 Mendez Hernandez ................... H02G 13/00
2011/0182731 A1 7/2011 Naka
(Continued)

FOREIGN PATENT DOCUMENTS

| CN | 101490412 A | 7/2009 |
| CN | 101603504 A | 12/2009 |
| CN | 202871975 U | 4/2013 |

OTHER PUBLICATIONS

International Search Report dated Jun. 17, 2014 issued in International Application No. PCT/EP2014/060536.
(Continued)

Primary Examiner — Kevin Lee
(74) Attorney, Agent, or Firm — Nath, Goldberg & Meyer; Jerald L. Meyer; Tanya E. Harkins

(57) ABSTRACT

A wind turbine blade is described having a lightning protection system, wherein the lightning protection system is arranged to protect conductive elements or modules used in or on the blade. In one aspect, the lightning protection system comprises a conductive band to be arranged around the circumference of the blade at the location of an internal conductive module, to prevent a lightning strike from penetrating the blade and potentially damaging the internal module. In another aspect, the lightning protection system comprises a lightning down-conductor having a signal-carrying structure, e.g. a signal cable, power cable, or a waveguide, integrated into the down-conductor. In a further aspect, the lightning protection system comprises at least one lightning receptor arranged to protect externally-mounted antennas from lightning strikes.

19 Claims, 6 Drawing Sheets

(56) References Cited

U.S. PATENT DOCUMENTS

2012/0141277 A1    6/2012  Yarbrough
2018/0010583 A1*   1/2018  Andersen et al. ...... F03D 80/30

OTHER PUBLICATIONS

Wind turbine generator systems—Part 24: Lightning protection for wind turbines (IEC 88/117/CD: 1999).

* cited by examiner

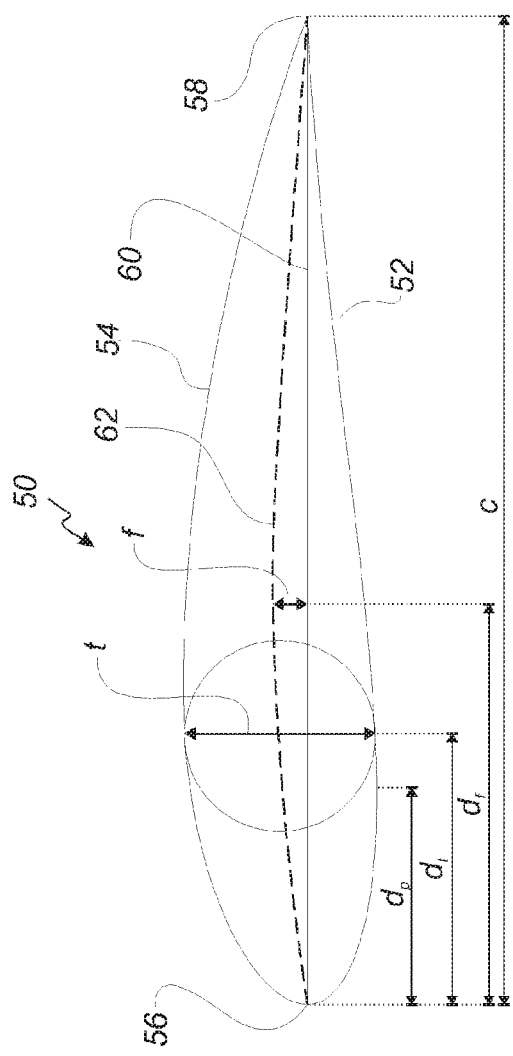
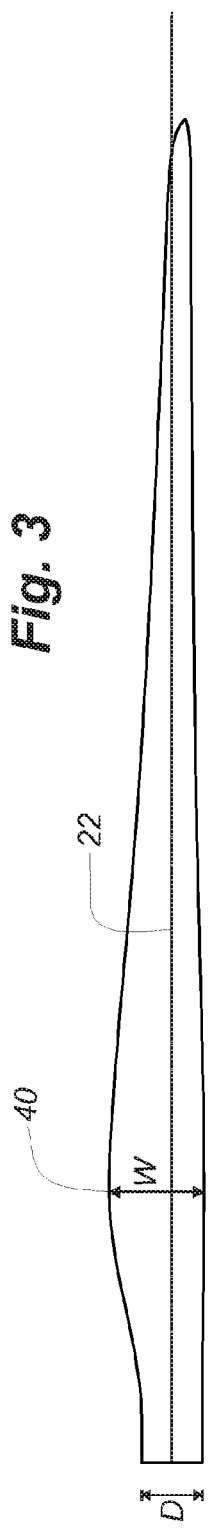
Fig. 3
Fig. 4

LIGHTNING PROTECTION SYSTEM FOR A WIND TURBINE BLADE

This is a National Phase Application filed under 35 U.S.C. 371 as a national stage of PCT/EP2014/060536, filed May 22, 2014, an application claiming the benefit of European Application No. 13169221.2, filed May 24, 2013, the content of each of which is hereby incorporated by reference in its entirety.

FIELD OF THE INVENTION

The present invention relates to a lightning protection system for a wind turbine blade, in particular a wind turbine blade having an internal conductive module, e.g. a blade sensor system, an antenna, etc.

BACKGROUND OF THE INVENTION

In increasing efforts to improve systems for the monitoring and control of wind turbine operation, wind turbine blades are sometimes provided with additional systems incorporated into the blade design. Such systems may comprise blade sensors and monitoring devices, e.g. strain and loading sensors, accelerometers; actuators for the control and operation of blade devices, such as active lift devices, e.g. flaps, spoilers, etc.; and/or deflection and position monitoring devices.

As such systems are often based on the use of controlling electronics, this can result in the provision of wind turbine blades having internal conductive modules provided along the length of the blade, spaced from the root end. Such conductive modules may act to attract a lightning strike, and accordingly require adequate lightning protection.

Traditional lightning protection of conductive elements in a blade involves the use of pluralities of external lightning receptors having lightning diverter strips extending freely therefrom, as seen in European Patent No. EP1709705. However, the increasing complexity of the internal conductive modules and their functions has led to the inadequacy of such current solutions, in respect of providing sufficient lightning protection combined with low interference with the operation of the modules.

It is an object of the invention to provide a lightning protection system for a wind turbine blade which provides improved performance over solutions.

SUMMARY OF THE INVENTION

Accordingly, there is provided a lightning protection system for a wind turbine blade, the wind turbine blade extending in a longitudinal direction parallel to a longitudinal axis and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the blade having at least one internal conductive module or element located along the longitudinal length of the blade spaced from the root end of the blade, the lightning protection system comprising:

at least one conductive band to be positioned around the circumference of the wind turbine blade at the longitudinal location of the said at least one internal conductive module or element, said conductive band to be coupled with a blade lightning down conductor for connection to a ground plane.

By providing a grounded conductive band around the perimeter of the wind turbine blade at the location of the internal conductive module, the module is protected from the possibility of a lightning strike on the blade, as any lightning current will be conducted away from the internal module by the conductive band to ground. Where the internal module comprises relatively sensitive electronics, e.g. blade sensor systems, antenna systems, etc., the use of such a lightning protection system on a wind turbine blade significantly increases the lifetime of such modules. It will be understood that the wind turbine blade is preferably provided as a shell structure formed of a fibre-composite material, e.g. glass fibres and/or carbon fibres suspended in a cured resin. It will further be understood that said at least one internal conductive module is positioned within the internal cavity defined by the shell structure. Preferably, said at least one conductive means is applied to the exterior of said shell structure. It will be understood that the wind turbine blade may be in excess of 30 meters in length.

In one aspect, said at least one conductive band is formed by a continuous conductive band, wherein said conductive band forms a partial Faraday cage around said at least one internal conductive module.

In an alternative aspect, said at least one conductive band is formed by a conductive diverter strip, preferably a segmented diverter strip. Preferably, a lightning receptor is coupled with said conductive diverter strip at said longitudinal location, wherein said lightning receptor is coupled with said blade lightning down conductor.

The use of a segmented diverter strip means that the positioning of the diverter strip adjacent the internal conductive module will have substantially no impact on the operation of the module, e.g. as a result of electro-magnetic interference. The diverter strip may be provided as an array of conductive elements or buttons arranged on an insulating substrate. When such conductive elements are exposed to a strong electrical field, such as a lightning strike, a conductive ionised channel is created in the air above the elements in which the current lightning can be conducted to a suitable ground connection, e.g. via the blade lightning down conductor.

In an alternative aspect, the diverter strip may be formed as a strip having conductive particles or powder disposed on the strip, e.g. aluminium powder, said particles operable to form such an ionised channel in the event of a lightning strike to conduct a lightning current to ground.

Preferably, the width of said conductive band along the longitudinal length of the blade is selected to be greater than the width of the internal conductive module, such that opposed edges of said conductive band are spaced in the longitudinal direction from corresponding opposed sides of the internal conductive module.

By selecting the width of the band based on the dimensions of the internal module to be protected, such that the edges of the band project a distance either side of the internal module, the risk of a lightning strike hitting the internal module is further reduced. Preferably, the width of said conductive band along the longitudinal length of the blade is selected to be at least 150% of the width of the internal conductive module along the longitudinal length of the blade.

In one aspect, the width of said conductive band along the longitudinal length of the blade is between 5-20 cm, preferably between 5-10 cm.

Preferably, said conductive band forms a continuous conductive path around the circumference or perimeter of the wind turbine blade at the longitudinal location of the said at least one internal conductive module.

By providing a continuous conductive path around the blade perimeter, any lightning strike on the blade at the location of the internal module will be received by the band, which can then be conducted to ground.

Preferably, said conductive band is formed from at least one of the following: a continuous conductive strip, tape, foil or ring; a conductive mesh or weave; a layer of conductive paint; etc.

Preferably, said conductive band comprises any suitable conductive material, e.g. a metallic material, e.g. copper, aluminium, steel, etc.

In one aspect, the lightning protection system may be formed integrally with a wind turbine blade structure.

The band may be provided as an integral part of the blade structure, e.g. as part of a blade manufacturing process. In such an embodiment, the at least one conductive band may be incorporated into the layup procedure for a fibre-composite blade, wherein the band is positioned in a blade mould in combination with layers of fibre-composite material which are subsequently infused with a resin and cured to form a wind turbine blade shell.

In such an aspect, the wind turbine blade may be formed from a plurality of separate blade shells which are assembled together to form a wind turbine blade, wherein said conductive band comprises a first segment provided on a first blade shell and a second segment provided on a second blade shell, wherein said first and second segments are coupled together to form said conductive band by the assembly of said first and second blade shells to form said wind turbine blade.

In this case, the first and second blade shells may comprise respective upwind and downwind blade shells.

In an alternative aspect, the lightning protection system is arranged to be retrofitted to an existing wind turbine blade.

As the band can be applied to a blade surface, it may be relatively easily retrofitted to an existing blade. Such a retrofitting operation may comprise attaching a conductive band to the blade surface, e.g. through an adhesive bond, bolting, riveting, etc., and/or applying a conductive paint to the blade surface, e.g. through a paint spraying operation.

In an additional or alternative aspect, the conductive band may be incorporated into a groove or recess in the surface of the wind turbine blade, such that the conductive band is substantially flush with the adjacent surface of the blade.

By positioning the band to be in line with the adjacent surface, the impact on the blade aerodynamics and noise properties due to the presence of the band is minimized. Such a system may include machining or cutting a suitable groove into the surface of an existing blade, to receive the band.

There is further provided a wind turbine blade having a lightning protection system as described above.

Preferably, said at least one internal conductive module comprises an antenna.

The use of an antenna within the blade interior can allow for the transmission of a wireless radio signal from a location along the length of the wind turbine blade. Such a signal may be used to transmit blade sensor outputs from a relatively remote position along the length of the blade, and/or the signal may be used as part of a time-of-flight ranging system, to monitor for blade deflection. Preferably, said antenna is an antenna suitable to broadcast an ultra-wide band signal (UWB).

Additionally or alternatively, said at least one internal conductive module may comprise a blade sensor module; e.g. a position sensor, an acceleration sensor; or a power supply module, e.g. a battery system, a kinetic generator.

Preferably, said lightning down conductor is an internal lightning down conductor.

The down conductor is preferably located within the internal blade cavity.

Preferably, said blade comprises at least one lightning receptor located towards the tip end of the blade, wherein said lightning down conductor extends from said at least one lightning receptor to the root end of the blade for connection to a ground plane.

Preferably, the wind turbine blade comprises at least one signal-carrying structure coupled to said at least one internal conductive module. Said at least one signal-carrying structure may comprise any suitable apparatus for conveying a signal to or from said module, e.g. a signal cable, a waveguide, etc. Additionally or alternatively, said signal-carrying structure may be arranged to provide power to said at least one internal conductive module.

Furthermore, there is also provided a lightning down conductor for a wind turbine blade, wherein a signal-carrying structure is incorporated into the interior of the lightning down-conductor, the lightning down-conductor configured to shield the internal signal-carrying structure.

By combining the signal-carrying structure with the lightning down conductor, accordingly the number of possible different conductive paths within a wind turbine blade is reduced. In addition, due to the shielding effect of the down conductor construction, the signal-carrying structure will not be damaged by a lightning strike, nor will the structure be impacted by any other electromagnetic interference in the vicinity of the down conductor.

In one embodiment, the lightning down conductor comprises:
   a central core;
   a first insulating layer positioned around the circumference of said central core; and
   a conductive shielding layer positioned around the circumference of said first insulating layer, wherein said central core comprises said signal-carrying structure.

The conductive shielding layer is selected to provide a shielding effect to the internal signal-carrying structure, as well as acting as a suitable path to ground for any lightning strikes which hit the blade.

Preferably, the lightning down conductor further comprises a second insulating layer positioned around the circumference of said conductive shielding layer.

In another embodiment, the lightning down conductor comprises a plurality of conductive cables positioned adjacent said internal signal-carrying structure, wherein said plurality of conductive cables are spaced equidistantly around the circumference of the internal signal-carrying structure.

Preferably, said plurality of conductive cables each comprise a conductive core surrounded by an insulating layer.

Preferably, said lightning down conductor comprises at least three conductive cables.

Preferably, said internal signal-carrying structure comprises at least one of the following: a signal cable, e.g. a coaxial or coax cable, or a waveguide. Said internal signal-carrying structure may comprise a layer of insulating material located around the perimeter of said internal signal-carrying structure.

Preferably, said conductive shielding layer or said conductive core comprises a metallic conductor, e.g. copper.

Preferably, said insulating layer or insulating material comprises any suitable electrically-insulating material, e.g. a plastics material, a polymer, a ceramic material, etc. Preferably, said insulator comprises a polythene material.

Furthermore, there is also provided a lightning protection system for a wind turbine blade, the wind turbine blade comprising at least one externally-mounted antenna, said at least one antenna projecting from the surface of the wind turbine blade at a height H above the surface of the blade, wherein the lightning protection system comprises a lightning receptor to be positioned above said at least one antenna at a height greater than H above the surface of the blade, said lightning receptor arranged for connection to a ground plane.

Preferably, said lightning receptor comprises a lightning rod.

Additionally or alternatively, the lightning receptor may comprise a conductive shielding plate or band, e.g. a substantially planar conductor, which projects over the location of the antenna, said conductive shielding plate or band positioned to be substantially parallel to the surface of the wind turbine blade.

In one aspect, said antenna is provided on a bracket projecting from the surface of the wind turbine blade, and wherein said lightning receptor is arranged to project from said bracket. Such a bracket may be relatively easily retrofitted to the surface of a blade.

DESCRIPTION OF THE INVENTION

An embodiment of the invention will now be described, by way of example only, with reference to the accompanying drawings, in which:

FIG. 3 shows a schematic view of an airfoil profile of the blade of FIG. 2;

FIG. 4 shows a schematic view of the wind turbine blade of FIG. 2, seen from above and from the side;

It will be understood that elements common to the different embodiments of the invention have been provided with the same reference numerals in the drawings.

Figure 1:
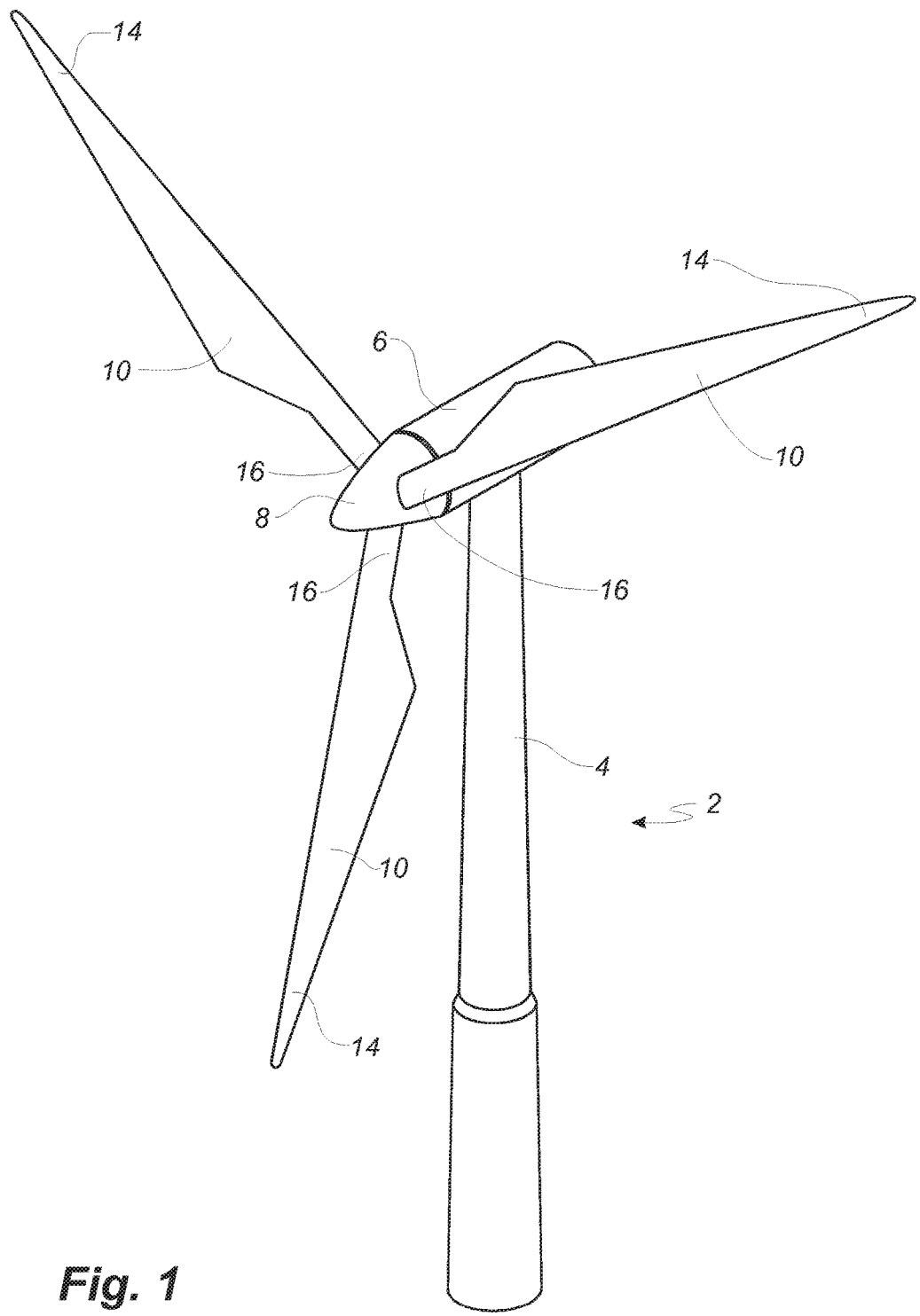
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
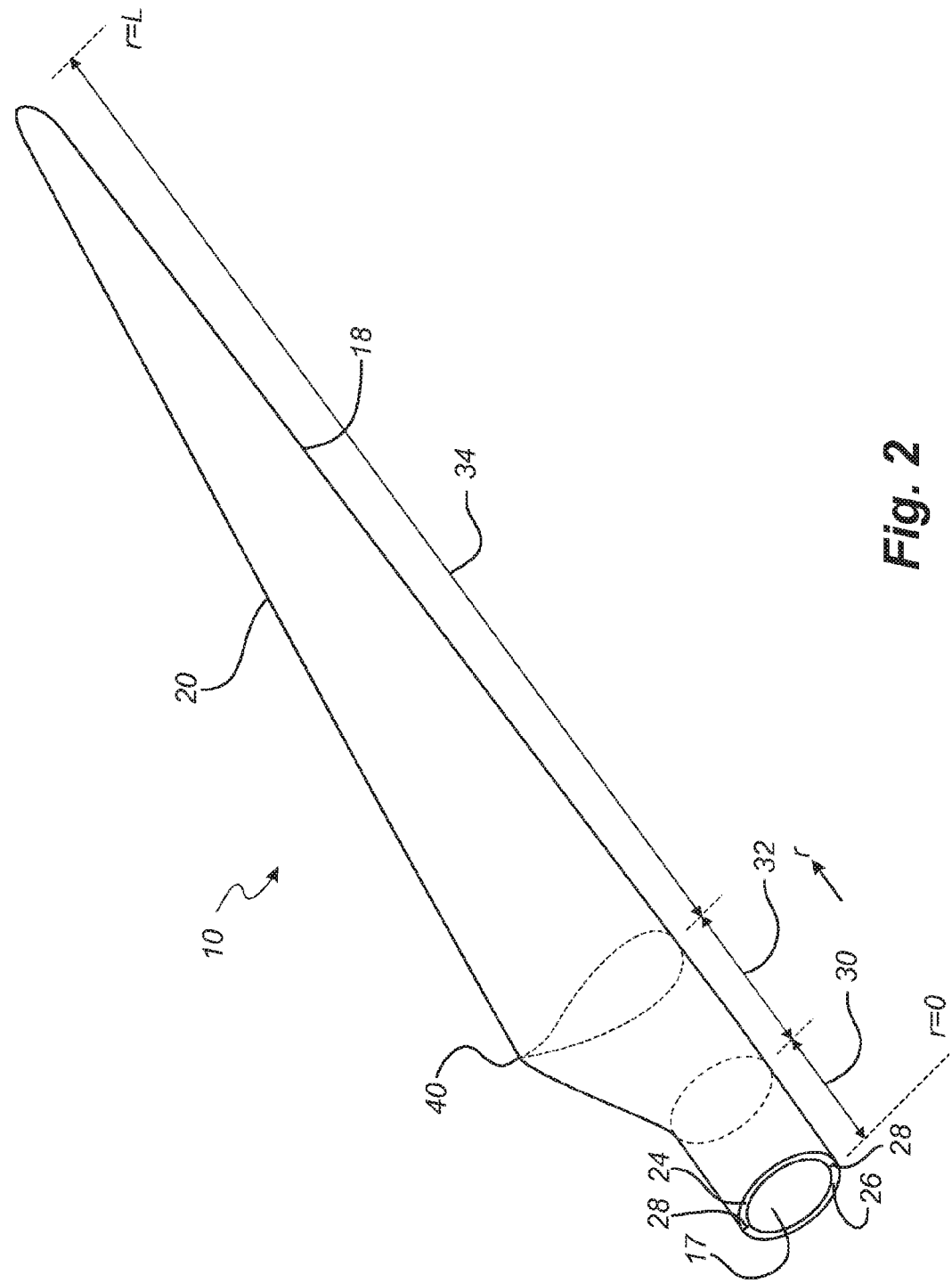
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile gradually changing from the circular or elliptical shape 40 of the root region 30 to the airfoil profile 50 (as shown in FIG. 3) of the airfoil region 34. The chord length of the transition region 32 typically increases substantially linearly with increasing distance r from the hub.

The airfoil region 34 has an airfoil profile 50 (as shown in FIG. 3) with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

With reference to FIG. 2, the wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 meters in length, having blade root diameters of several meters. Wind turbine blades are generally designed for relatively long lifetimes and to withstand considerable structural and dynamic loading.

Figure 5:
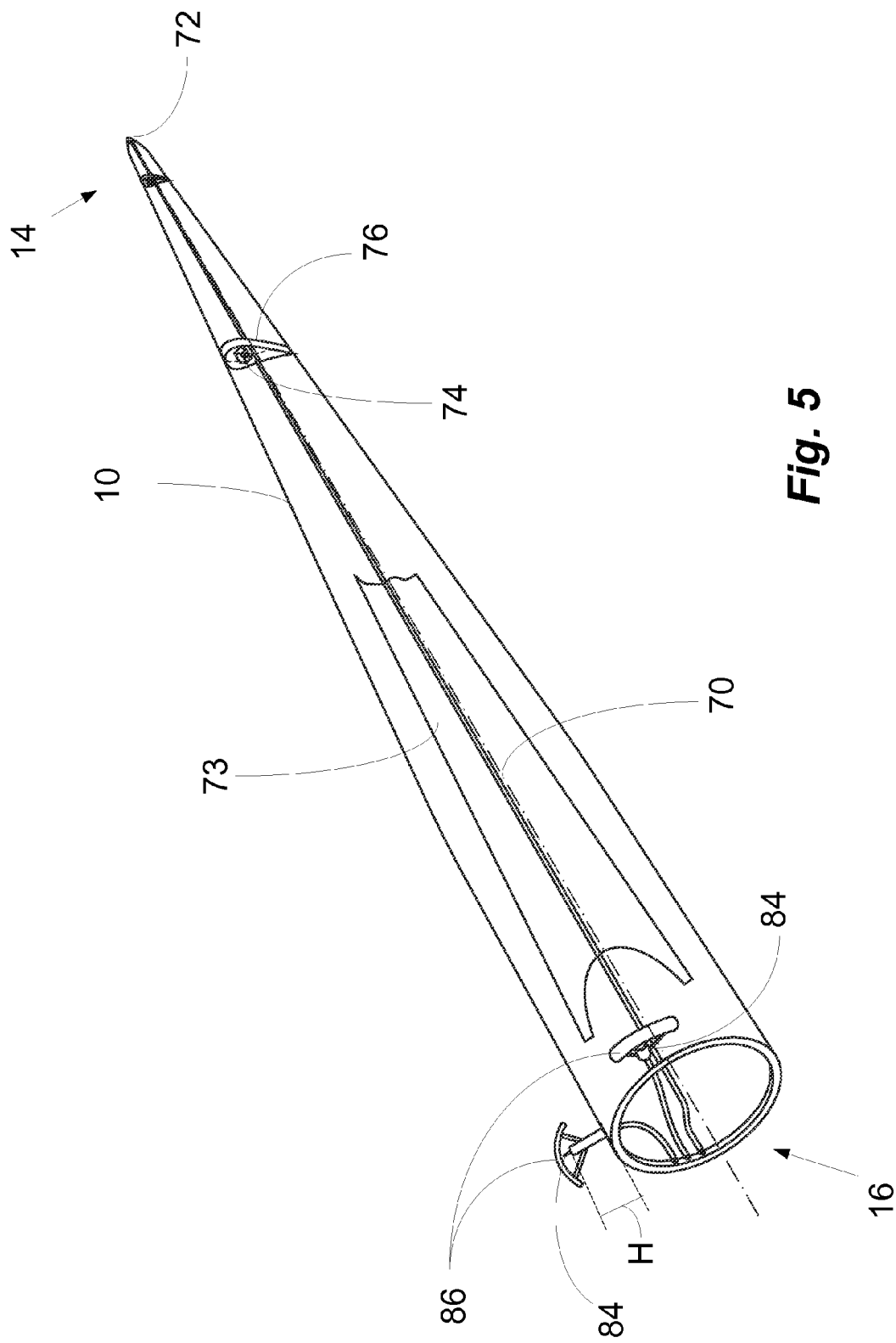
FIG. 5 illustrates a cross-sectional cutaway isometric view of a blade according to an embodiment of the invention.

With reference to FIG. 5, the blade 10 comprises an internal lightning down-conductor 70, which may be provided in the form of a conductive cable. The down-conductor 70 is connected to at least one lightning receptor 72 provided at the tip end 14 of the blade 10, and extends through the interior of the blade 10 to the root end 16, where the down-conductor 70 may be connected to ground via the greater wind turbine structure. The down-conductor 70 may be supported on internal structural webs 73 provided within the internal cavity of the blade 10. The down-conductor 70 acts to provide a conductive path to a ground plane within the blade 10, acting to conduct a lightning current through the blade 10 in the event of a lightning strike at a lightning receptor 72 without damaging the blade structure.

The blade 10 comprises at least one further conductive element 74 located within the blade 10, the at least one conductive element 74 spaced from the root end 16 of the blade 10 towards the tip end 14 of the blade 10. It will be understood that the at least one conductive element 74 can include any suitable device which may be located along the length of the blade 10, for example the at least one conductive element 74 may comprise one of or a combination of any of the following: a blade sensor module; e.g. a position sensor, an acceleration sensor; a remote power supply module, e.g. a battery system, a kinetic generator; an antenna; a transmitter; a receiver; a transceiver. In one aspect, the conductive element 74 comprises an antenna arranged to transmit or receive a signal having a radar reflective screen arranged substantially around the antenna, e.g. a corner reflector. Preferably, the at least one conductive element 74 comprises an antenna suitable to broadcast an ultra-wide band (UWB) communications signal. Preferably, the antenna is used as part of a time-of-flight ranging system, to monitor for deflection of the wind turbine blade 10 during turbine operation. Preferably, the blade 10 comprises two conductive elements 74 located in the distal half of the wind turbine blade 10, a first element located relatively close to the tip end 14 of the blade 10 and a second element located spaced from the first element towards the root end 16.

As the at least one conductive element 74 may provide a location for a possible lightning strike, additional protective measures are required for the safe operation of the wind turbine blade 10. Accordingly, at the location along the length of the wind turbine blade 10 where the at least one conductive element 74 is located, a conductive band 76 is arranged around the circumference of the blade 10 at said location, such that the internally-positioned conductive element 74 is effectively shielded from a lightning strike on the blade 10 at that location. The conductive element 76 is connected to the lightning down-conductor 70, such that a lightning strike on the conductive band 76 will be conducted to ground as described above.

Figure 6:
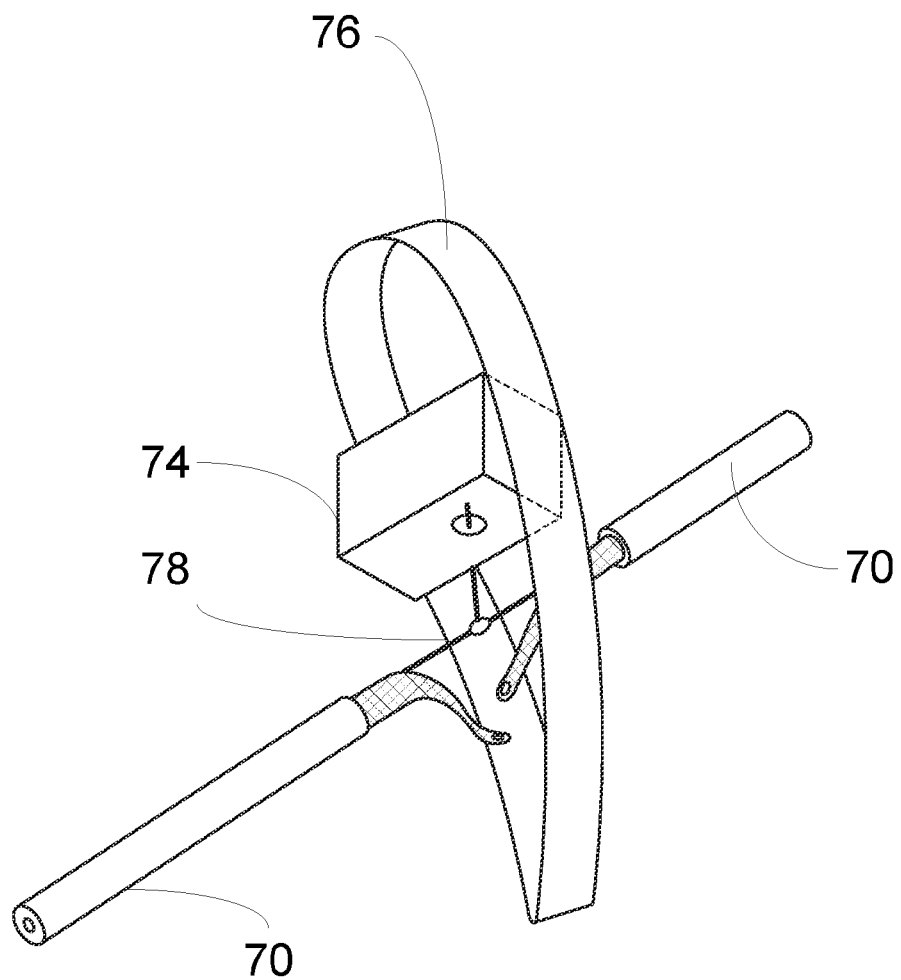
FIG. 6 illustrates an enlarged view of a portion of the components of the blade of FIG. 5.

With reference to FIG. 6, an enlarged view of the at least one conductive element 74, the conductive band 76, and a portion of the lightning down-conductor 70 is presented. The conductive band 76 is arranged around the periphery of the wind turbine blade 10 at the location of the at least one conductive element 74, such that the band 76 assumes the airfoil profile of the blade at the said location. The conductive band 76 may be formed from any suitable conductive material, in any suitable structure. The band 76 may be formed from at least one of the following: a continuous conductive strip, tape, foil or ring; a conductive mesh or weave; a layer of conductive paint; etc.

In one preferred embodiment not illustrated, the band 76 may be formed as a segmented diverter strip arranged around the circumference of the blade 10. The strip may extend from a location adjacent to a lightning receptor, the lightning receptor connected to the internal down-conductor 70. Such a segmented diverter strip may comprise an array of separate conductive elements or buttons provided on a non-conductive substrate. In the event of a lightning strike at the location of the strip, an ionisation channel is formed above the surface of the strip, allowing for the conduction of a lightning current between adjacent buttons of the strip, such that a lightning current may be conducted by the diverter strip to the lightning receptor, for a subsequent conduction to ground via the internal down-conductor 70.

The use of such a segmented diverter strip as the conductive band 76 allows for the lightning protection of the internally-located conductive element 74, without affecting the operation of the conductive element 74, e.g. by electromagnetic interference or shielding effects. This is particularly advantageous in cases where the conductive element 74 may comprising an antenna, transmitter, or receiver, etc., wherein the transmission or reception of a wireless radio signal by the conductive element 74 may be impacted by the shielding effect of a conductive band 76 in the form of a continuous strip of conductive material.

The conductive band 76 may comprise any suitable conductive material, e.g. a metallic material such as copper, aluminium, steel, etc.

The conductive band 76 is arranged around the circumference of the blade 10 at the location of the at least one internal conductive element 74, to prevent a lightning strike at said location from penetrating the blade 10 and hitting the at least one internal conductive element 74, regardless of the orientation of the lightning strike. In a further enhancement of the invention, the width of the conductive band 76 may be selected so as to project beyond either side of the internal conductive element 74 along the longitudinal direction of the blade 10, to provide further protection against a lightning strike penetrating to the blade interior. Preferably, the conductive band 76 is selected to have a width of at least 150% of the length of the internal conductive element 74 when measured along the longitudinal direction of the blade 10, the band 76 arranged so as to project an equal distance either side of the internal element 74. In an alternative aspect, the conductive band 76 is selected to have a width of at least 100% of the length of the internal conductive element 74.

In a further aspect of the invention, the conductive band 76 may be provided with a plurality of diverter strips, preferably segmented diverter strips, extending freely from the conductive band 76 over the surface of the blade 10, thereby providing increased lightning protection for the internally-located conductive element 74.

It will be understood that the at least one conductive element 74 may be provided as a self-contained blade module, e.g. having a remote power source and capable of remote operation. In a further aspect, the blade 10 may be provided with a signal-carrying structure 78 arranged to transmit a data signal and/or a power signal along the length of the blade to or from said at least one conductive element 74. The signal-carrying structure 78 may be coupled with a signal transmitter or receiver, and/or a power supply, located at the root end 16 of the blade 10 or in the hub 8 or nacelle 6 of the wind turbine structure. In the embodiment shown in FIG. 6, the signal-carrying structure 78 is provided as a cable which may be integrated into the lightning down-conductor 70. The lightning down-conductor 70 may be arranged to provide a shielding of the signal-carrying structure 78, such that the signal-carrying structure will not be damaged by a lightning strike, nor will the structure be impacted by any other electromagnetic interference in the vicinity of the down conductor.

In FIG. 6, the signal-carrying structure 78 is integrated with the lightning down-conductor 70, wherein at the location of the at least one conductive element 74, the the signal-carrying structure 78 is connected to the conductive element 74, e.g. for the provision of power, transmission of data, etc. At the said location the lightning down-conductor 70 is connected to the conductive band 76, establishing a conductive connection of the conductive band 76 to ground.

Figure 7:
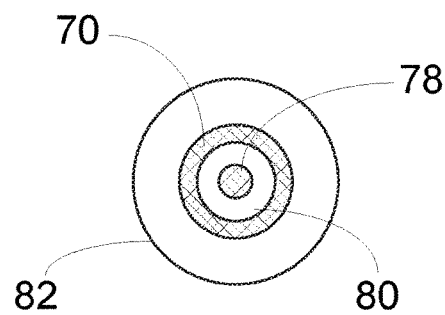
FIG. 7 illustrates cross-sectional views of embodiments of lightning down-conductors according to the invention incorporating an integrated signal-carrying structure.
Figure 7:
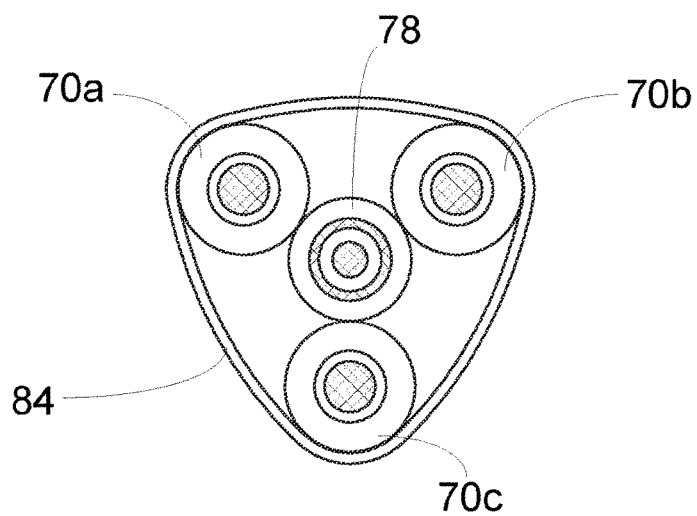

With reference to FIG. 7, two possible configurations of lightning down-conductor 70 having an integrated signal-carrying structure 78 are illustrated in cross-section.

In FIG. 7(a), the signal-carrying structure 78 is provided as a central core of a lightning down-conductor cable, where an insulating layer 80 is located between the signal-carrying core 78 and a layer of conductive material forming the lightning down-conductor 70 conductive path. A second insulating layer 82 is then arranged around the outside of the layer of conductive material 78. Preferably, the second insulating layer 82 is approximately 4.5 mm thick, preferably formed of PEX.

In FIG. 7(b), the lightning down conductor comprises a plurality of conductive cables 70a,70b,70c positioned around an internal signal-carrying structure 78 in the form of a cable, preferably a coaxial cable. The plurality of conductive cables 70a,70b,70c, preferably at least three, are paced equidistantly around the circumference of the internal signal-carrying structure 78. This structure provides a relatively simple construction, which can be formed using a collection of pre-existing cables arranged in the indicated configuration. Furthermore, the dimensions of the conductive cables 70a,70b,70c may be selected such that a lightning strike may be conducted equally across each cable. In this regard, a collection of three separate cables 70a,70b,70c may be selected to each conduct ⅓ of the charge which would be conducted by a single, relatively larger, lightning down-conductor cable. The assembly of cables 70a,70b,70c,78 may be secured together through the application of an outer sheath or jacket 84.

While the signal-carrying structure 78 may be provided as a conductive cable, it will be understood that the signal-carrying structure 78 may be provided as a waveguide for the transmission of a signal to be transmitted by an antenna located at the at least one conductive element 74.

In a further embodiment, the wind turbine blade 10 may be provided with at least one externally-mounted antenna 84, located towards the root end 16 of the blade 10. The antenna 84 may be used in connection with a ranging or distance-measurement application, to monitor for the deflection of the wind turbine blade 10 during turbine operation. To minimise the effect of signal reflections from the surface of the wind turbine blade 10, the antenna 84 is positioned at a height H above the surface of the blade 10. The antenna 84 may be positioned on an external bracket. A further lightning receptor 86 is positioned above the antenna 84, to provide protection for the antenna 84 from the possibility of lightning striking the antenna 84. The lightning receptor 86 is preferably arranged at a height above the surface of the blade 10 greater than a length H. Further preferably, the receptor 86 is provided as a conductive shielding plate or band, e.g. a substantially planar conductor, which projects over the location of the antenna. The receptor 86 is preferably arranged to be substantially parallel to the blade surface, such that the receptor provides an effective shielding for the covered antenna 84, regardless of the orientation or pitching of the wind turbine blade 10. The lightning receptor 86 is preferably conductively connected to the lightning down-conductor 70 for subsequent connection to ground, or the receptor 86 may comprise a separate ground connection.

It will be understood that the lightning protection system of the invention may be provided as an integral part of a wind turbine blade during blade manufacture, or may be retrofitted to an existing blade. In the case of the conductive band 76, the band may be formed integrally with blade components, e.g. applied as part of a layup procedure in a blade mould, or the band may be applied to the surface of a wind turbine blade after manufacture. For the retrofitting of a conductive band 76 to the surface of a blade 10, a groove or channel to receive the band 76 may be formed or machined in the blade surface, to allow the band 76 to be positioned on the blade substantially flush with the surrounding blade surface, to minimise any negative affects to blade aerodynamics.

The use of a blade having such a lightning protection system provides protection for blade components in the event of a lightning strike on the blade.

The invention is not limited to the embodiment described herein, and may be modified or adapted without departing from the scope of the present invention.

The invention claimed is:

1. A wind turbine blade comprising a lightning protection system, the wind turbine blade extending in a longitudinal direction parallel to a longitudinal axis and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the wind turbine blade further comprising at least one externally-mounted antenna, said at least one antenna projecting from a surface of the wind turbine blade at a height (H) above the surface of the wind turbine blade, wherein the lightning protection system comprises a lightning receptor adapted for positioning above said at least one antenna at a height greater than said height (H) above the surface of the blade, said lightning receptor arranged for connection to a ground plane.

2. The wind turbine blade of claim 1, wherein said lightning receptor comprises a lightning rod.

3. The wind turbine blade of claim 1, wherein the lightning receptor comprises a conductive shielding plate or band which projects over a location of the antenna, said conductive shielding plate or band positioned to be substantially parallel to the surface of the wind turbine blade.

4. The wind turbine blade of claim 1, wherein said antenna is provided on a bracket projecting from the surface of the wind turbine blade, and wherein said lightning receptor is arranged to project from said bracket.

5. The wind turbine blade of claim 1, wherein the blade comprises at least one internal conductive module or element located along a longitudinal length of the blade spaced from the root end of the blade, the lightning protection system comprising:
   at least one conductive band to be positioned around the circumference of the wind turbine blade at a longitudinal location of said at least one internal conductive module or element, said conductive band to be coupled with a blade lightning down conductor for connection to a ground plane.

6. The wind turbine blade as claimed in claim 5, wherein a width of said conductive band along the longitudinal length of the blade is selected to be greater than the width of the internal conductive module, such that opposed edges of said conductive band are spaced in the longitudinal direction from corresponding opposed sides of the internal conductive module.

7. The wind turbine blade as claimed in claim 5, wherein said at least one conductive band is formed by a continuous conductive band, wherein said conductive band is arranged to form a partial Faraday cage around said at least one internal conductive module of the wind turbine blade.

8. The wind turbine blade as claimed in claim 5, wherein said conductive band is formed from at least one of the following: a continuous conductive strip, tape, foil or ring; a conductive mesh or weave; or a layer of conductive paint.

9. The wind turbine blade as claimed in claim 5, wherein said at least one conductive band is formed by a conductive diverter strip.

10. The wind turbine blade as claimed in claim 9, wherein a lightning receptor is coupled with said conductive diverter strip at said longitudinal location, wherein said lightning receptor is coupled with a blade lightning down conductor.

11. The wind turbine blade as claimed in claim 5, wherein the lightning protection system is formed integrally with the wind turbine blade.

12. The wind turbine blade as claimed in claim 5, wherein the lightning protection system is retrofitted to the wind turbine blade.

13. The wind turbine blade as claimed in claim 1, wherein the blade comprises a lightning down conductor, wherein a signal-carrying structure is incorporated into an interior of the lightning down-conductor, the lightning down-conductor configured to shield the signal-carrying structure.

14. The wind turbine blade as claimed in claim 13, wherein, the lightning down conductor comprises:
   a central core;
   a first insulating layer positioned around a circumference of said central core; and
   a conductive shielding layer positioned around a circumference of said first insulating layer, wherein said central core comprises said signal-carrying structure.

15. The wind turbine blade as claimed in claim 13, wherein the lightning down conductor comprises a plurality of conductive cables positioned adjacent said signal-carrying structure, wherein said plurality of conductive cables are spaced equidistantly around a circumference of the signal-carrying structure.

16. The wind turbine blade as claimed in claim 5, wherein said at least one internal conductive module comprises an antenna.

17. The wind turbine blade as claimed in claim 5, wherein said at least one internal conductive module comprises a blade sensor or power supply module, comprising at least one of the following: a position sensor, an acceleration sensor, a strain sensor, a battery system, a kinetic generator.

18. The wind turbine blade as claimed in claim 9, wherein the conductive diverter strip comprises a segmented diverter strip.

19. A wind turbine comprising at least one wind turbine blade as claimed in claim 1.

* * * * *